(12) United States Patent
Nakamura et al.

(10) Patent No.: US 10,077,500 B2
(45) Date of Patent: Sep. 18, 2018

(54) WATER SPLITTING CATALYST, AND METHOD FOR PRODUCING OXYGEN AND HYDROGEN USING THE SAME

(71) Applicant: RIKEN, Wako-shi, Saitama (JP)

(72) Inventors: Ryuhei Nakamura, Wako (JP); Kazuhito Hashimoto, Tokyo (JP); Akira Yamaguchi, Tokyo (JP); Hirotaka Kakizaki, Tokyo (JP); Toru Hayashi, Tokyo (JP)

(73) Assignee: RIKEN, Wako-shi, Saitama (JP)

( * ) Notice: Subject to any disclaimer, the term of this patent is extended or adjusted under 35 U.S.C. 154(b) by 502 days.

(21) Appl. No.: 14/670,541

(22) Filed: Mar. 27, 2015

(65) Prior Publication Data

US 2015/0275379 A1 Oct. 1, 2015

(30) Foreign Application Priority Data

Mar. 27, 2014 (JP) .................................. 2014-066565

(51) Int. Cl.
| | | |
|---|---|---|
| C25B 1/04 | (2006.01) | |
| C25B 9/06 | (2006.01) | |
| C25B 11/16 | (2006.01) | |
| C25B 11/04 | (2006.01) | |

(52) U.S. Cl.
CPC .................. *C25B 1/04* (2013.01); *C25B 9/06* (2013.01); *C25B 11/0452* (2013.01); *C25B 11/16* (2013.01); *Y02E 60/366* (2013.01)

(58) Field of Classification Search
None
See application file for complete search history.

(56) References Cited

U.S. PATENT DOCUMENTS

2010/0133111 A1* 6/2010 Nocera ............... H01M 14/005
205/633

FOREIGN PATENT DOCUMENTS

| CN | 101630593 A | * | 1/2010 | |
| WO | WO 2013127920 A1 | * | 9/2013 | ............. B82Y 30/00 |

OTHER PUBLICATIONS

Manganese Dioxide, http://web.archive.org/web/20130128052814/https://en.wikipedia.org/wiki/Manganese_dioxide, Jan. 28, 2013.*
Tyrrell et al. ("History of carbonate ion concentration over the last 1000 million years," Geochimica et Cosmochimica Acta, vol. 68, No. 17, pp. 3521-3530, 2004.) (Year: 2004).*
Robin Brimblecombe, et al., "Sustained Water Oxidation Photocatalysis by a Bioinspired Manganese Cluster", Angewandte Chemie Int. Ed., 2008, pp. 7335-7338, vol. 47.
Jacob S. Kanady, et al., "A Synthetic Model of the Mn₃Ca Subsite of the Oxygen-Evolving Complex in Photosystem II", Science, Aug. 5, 2011, pp. 733-737, vol. 333.

(Continued)

*Primary Examiner* — Nicholas A Smith
(74) *Attorney, Agent, or Firm* — Sughrue Mion, PLLC (57) ABSTRACT

Provided is a catalyst that exhibits a high catalyst activity in a water oxidation reaction within a neutral range. A water splitting catalyst comprises at least one 3d-block transition metal element selected from manganese, iron, cobalt, nickel, and copper or a compound containing the element, and a base and/or a carbonate having a pKa of 8 or less.

10 Claims, 5 Drawing Sheets

(56) References Cited

OTHER PUBLICATIONS

Yixin Zhao, et al., "Anodic Deposition of Colloidal Iridium Oxide Thin Films from Hexahydroxyiridate (IV) Solutions", Small, 2011, pp. 2087-2093, vol. 7, No. 14.
Anthony Harriman, et al., "Metal Oxides as Heterogeneous Catalysts for Oxygen Evolution under Photochemical Conditions", J. Chem. Soc., Faraday Trans. 1, 1988, pp. 2795-2806, vol. 84, No. 8.
Sergio Trasatti, et al., "Ruthenium dioxide: a new interesting electrode material. Solid state structure and electro-chemical behaviour", J. Electroanal. Chem., 1971, pp. 1-5, vol. 29.

\* cited by examiner

WATER SPLITTING CATALYST, AND METHOD FOR PRODUCING OXYGEN AND HYDROGEN USING THE SAME

BACKGROUND OF THE INVENTION

Field of the Invention

The present invention relates to a water splitting catalyst, and a method for producing oxygen and hydrogen using the same.

Related Background Art

Water is the most abundant electron source present in nature, and can be said as an important chemical resource playing roles in producing oxygen and hydrogen by proton reduction, and in synthesizing a substance by carbon dioxide reduction. Nevertheless, it is only noble metals such as iridium and ruthenium that are known as catalysts excellent in a reaction for artificially acquiring electrons from water, that is, oxygen generation reaction ($2H_2O \rightarrow O_2 + 4H^+ + 4e^-$) (S. Trasatti, G. Buzzanca, J. Electroanal. Chem., 1971, 29, A1. A. Harriman, I. J. Pickering, J. M. Thomas, P. A. Christensen, J. Chem. Soc., Faraday Trans. 1, 1988, 84, 2795. Yixin Zhao, Nella M. Vargas-Barbosa, Emil A. Hernandez-Pagan and Thomas E. Mallouk, small 2011, 7(14), 2087). The development of catalyst materials made of 3d-block transition metal elements present abundantly has been desired.

Manganese is the only 3d-block transition metal element that catalyzes oxygen generation in nature. In photosynthetic photosystem II (photochemical system II complex, PSII), a Mn4-cluster exhibits high catalyst activity and substrate selectivity in an oxidation reaction of water. Accordingly, as a design guideline for obtaining a catalyst capable of efficiently oxidizing water, an approach has been adopted for mimicking the structure of a Mn4-cluster (Kanady J S, Tsui E Y, Day M W, Agapie T., Science. 2011 Aug. 5; 333(6043): 733-6. Brimblecombe R., Swiegers G. F., Dismukes G. C., Spiccia L., Angew Chem Int Ed, 2008, 47, 7335-7338).

However, many artificial manganese catalysts mimicking the structure have a low activity, and require a large energy application to drive the reaction particularly within a neutral range. As a result, an artificial photosynthetic system utilizing such a manganese catalyst has a problem of very low energy conversion efficiencies in producing oxygen and hydrogen, and in utilizing carbon dioxide as a resource.

SUMMARY OF THE INVENTION

The present invention has been made in view of the above-described problems in the conventional techniques. An object of the present invention is to provide a catalyst that exhibits a high catalytic activity in a water oxidation reaction within a neutral range.

Means for Solving the Problem

In a water oxidation reaction, an artificial manganese catalyst exhibits a high activity under an alkaline condition. It is known, however, that the catalyst activity and the stability of such an artificial manganese catalyst are very low under an approximately neutral condition as described above. As a result of earnest studies on this point, the present inventors have revealed that Mn(III) is a reaction intermediate in an oxidation of water using α-manganese dioxide, and that the oxidation of water progresses after the generation of Mn(III). This Mn(III) is stable within a basic range, but is disproportionated into Mn(II) and Mn(IV) ($2Mn(III) \rightarrow Mn(II) + Mn(IV)$) within a neutral range. Accordingly, in a neutral range, the electrochemical regeneration process of Mn(III) ($Mn(II).OH_2 \rightarrow Mn(III).OH + e^- + H^+$) is a rate-limiting step of the reaction. Thus, in order to enhance the catalytic activity of manganese within a neutral range, it is essential to decrease the activation energy of the Mn(III) regeneration reaction serving as the rate-limiting step. The oxidation reaction of Mn(II) does not depend on the pH and progresses at 1.5 V vs. SHE. In other words, since the reaction is a one-electron oxidation reaction ($Mn(II).OH_2 \rightarrow Mn(III).OH_2 + e^-$) involving no proton transfer, this induces a great reduction in the activity within a neutral range. Mn(II)→Mn(III) is believed to be a consecutive reaction in which a proton transfer reaction takes place after an electron transfer reaction. The present inventors have conceived that if it is possible to change this consecutive reaction to a reaction in which protons and electrons are transferred to a substrate at the same time (reaction driving concerted proton-electron transfer (CPET)) within a neutral range, the reaction progresses without an unstable intermediate, and can enhance the catalytic activity.

Hence, the present inventors have conducted earnest studies based on such an idea. As a result, the inventors have found that, in an oxidative decomposition system for water using α-manganese dioxide, adding a base (including pyridine and derivatives thereof) or a carbonate (sodium hydrogen carbonate) having a pKa of 8 or less makes it possible to enhance the catalytic activity of α-manganese dioxide within a neutral range. The enhancement of the catalyst activity by the addition of these compounds is presumably both attributable to driving of the above-described CPET.

Note that the disproportionation characteristic exhibited by the reaction intermediate such as Mn(III) described above is not limited to that of manganese and is also observed in other 3d-block transition metal elements (iron, cobalt, nickel, and copper) having a degenerated electron configuration. Thus, based on this novel finding regarding manganese, it is apparent that in oxidative decomposition systems for water using iron, cobalt, nickel, and copper also, adding a base and/or a carbonate having a pKa of 8 or less enhances the catalyst activities of these 3d-block transition metal elements.

Moreover, such an oxidation using a 3d-block transition metal element targets not only water but also such a base. Accordingly, the oxidative decomposition of a base also progresses, while competing with the water oxidation. Hence, in order to more stably enhance the catalyst activity of manganese dioxide within a neutral range, the present inventors have next evaluated the specificity to water (coulombic efficiency) in an oxidative decomposition reaction in the coexistence of pyridine by using four types of manganese dioxide having different crystal structures (α-manganese dioxide, β-manganese dioxide, γ-manganese dioxide, δ-manganese dioxide) as electrode catalysts. As a result, it has been found out that the coulombic efficiency of α-manganese dioxide described above is 54%, while that of β-manganese dioxide is 88%, indicating that the specificity to water is enhanced by 30% or more in comparison with α-manganese dioxide. Further, the present inventors have found that the amount of oxygen generated by water splitting in the case where a catalyst contains β-manganese dioxide is enhanced 3- to 4-fold in comparison with the case where a catalyst contains α-manganese dioxide. These findings have led to the completion of the present invention.

Specifically, the present invention relates to a water splitting catalyst, and a method for producing oxygen and hydrogen using the same. More specifically, the present invention provides the following inventions.

(1) A water splitting catalyst comprising:
at least one 3d-block transition metal element selected from manganese, iron, cobalt, nickel, and copper or a compound containing the element; and
a base and/or a carbonate having a pKa of 8 or less.
(2) The water splitting catalyst according to (1), wherein the compound containing the 3d-block transition metal element is manganese dioxide.
(3) The water splitting catalyst according to (1), wherein the compound containing the 3d-block transition metal element is β-manganese dioxide.
(4) The water splitting catalyst according to any one of (1) to (3), wherein the base is a nitrogen-containing heterocyclic compound.
(5) The water splitting catalyst according to any one of (1) to (3), wherein the base is collidine.
(6) A method for producing oxygen and hydrogen, comprising bringing water into contact with the water splitting catalyst according to any one of (1) to (5) to split the water.
(7) The method according to (6), wherein the water has a pH of 6 to 8.

The present invention makes it possible to efficiently oxidize and split water within a neutral range, and produce oxygen, hydrogen, and the like.

DETAILED DESCRIPTION OF THE PREFERRED EMBODIMENTS

<Water Splitting Catalyst>

As described later in Examples, it has been revealed that, in a water oxidation reaction within a neutral range, adding a base or a carbonate having a pKa of 8 or less enhances the catalyst activity of manganese. This catalyst activity enhancement is presumably, as described above, attributable to a progress of the reaction without an unstable reaction intermediate by driving a reaction in which protons and electrons are transferred to a substrate at the same time (CPET) within a neutral range. Moreover, the disproportionation characteristic exhibited by the reaction intermediate is not limited to that of manganese, and is also observed in other first transition elements (iron, cobalt, nickel, and copper) having a degenerated electron configuration. Thus, it is apparent based on the above-described finding obtained regarding manganese that adding a base and/or a carbonate having a pKa of 8 or less makes it possible to enhance the catalyst activities of these 3d-block transition metal elements in an oxidative decomposition system for water.

Thus, the present invention provides a water splitting catalyst comprising:
at least one 3d-block transition metal element selected from manganese, iron, cobalt, nickel, and copper or a compound containing the element; and
a base and/or a carbonate having a pKa of 8 or less.

The type of the first transition element contained in the water splitting catalyst of the present invention is as described above. Nevertheless, manganese is preferable from the viewpoints of the abundance in nature, the durability of the catalyst, and the easiness of the synthesis.

Moreover, the compound containing the 3d-block transition metal element (metal) is not particularly limited. Examples thereof include metal oxides, metal hydroxides, metal halides, metal acid halides, metal alkoxides, metal phosphates, metal sulfates, metal nitrates, metal organic acid salts, metal perhalates, and metal hypohalites.

Examples of the compound containing manganese include manganese dioxides such as α-$MnO_2$ having a 2×2 tunnel structure, β-$MnO_2$ having a 1×1 tunnel structure, γ-$MnO_2$ having a 2×1·1×1 tunnel structure, and δ-$MnO_2$ having a layered structure, or $CaMnO_3$ or $SrMnO_3$ having a perovskite structure. From the viewpoints of the durability of the catalyst and the easiness of the synthesis, $MnO_2$ is preferable. From the viewpoint that water can undergo an oxidative decomposition with a high specificity in the presence of a base also as described later in Examples, β-$MnO_2$ is particularly preferable.

The "base" contained in the catalyst of the present invention should have a pKa of 8 or less, preferably 5 to 8, more preferably 6 to 8, and furthermore preferably 7 to 8, from the viewpoint that the higher the value of pKa, the higher the catalyst activity is exhibited in a water oxidation reaction within a neutral range as described later in Examples. Moreover, in a case where the pH of water targeted by the oxidative decomposition in which the catalyst of the present invention is involved is lower than the pKa of the base contained in the catalyst, the base is protonated, so that the protons are hardly transferred. Hence, the pKa of the base is preferably lower than the pH of water. Note that, in the present invention, pKa refers to an acid dissociation constant of a conjugate acid of the base in water at 25° C. Additionally, the base having a pKa of 8 or less may be an organic base or an inorganic base. Examples thereof include nitrogen-containing heterocyclic compounds such as pyridine, picoline, lutidine, collidine, and 4-dimethylaminopyridine (DMAP), amines such as N-methylmorpholine, anilines such as dimethylaniline and diethylaniline, carboxylic acids such as benzoic acid, salts and esters of the carboxylic acids, silica, and metal alkoxides, metal salts of alkali metals, and the like. Among these, nitrogen-containing heterocyclic compounds are preferable from the viewpoints of the excellent proton transfer ability and the stability in an oxidative decomposition reaction; collidine is more preferable from the viewpoint that a higher catalyst activity can be induced in a water oxidation reaction within a neutral range as described later in Examples.

Further, the "carbonate" contained in the catalyst of the present invention should be capable of producing hydrogen carbonate ions when dissolved in water. Such a carbonate is not particularly limited. Examples thereof include sodium carbonate, potassium carbonate, calcium carbonate, and ammonium carbonate. Furthermore, the carbonate of the present invention also includes so-called hydrogen carbonates such as sodium hydrogen carbonate, potassium hydrogen carbonate, calcium hydrogen carbonate, and ammonium hydrogen carbonate. Moreover, among these, hydrogen carbonates are preferable, and sodium hydrogen carbonate is more preferable from the viewpoints that when added to water for use during a water oxidation reaction to be described later, such carbonates are easily dissolved therein, and that it is easy to adjust the pH of the water.

The form of the catalyst of the present invention is not particularly limited, and may be a solid catalyst, or the catalyst may be supported by a support. Examples of the support for supporting the catalyst include conductive ceramics such as FTO (fluorine-doped tin oxide) and ITO (indium tin oxide), metals such as nickel and platinum, and carbons such as acetylene black and ketjen black (conductive carbon materials). FTO is preferable from the viewpoints of a high heat resistance while supporting the catalyst, and a high light transmittance in the visible region.

The method for preparing the catalyst of the present invention is not particularly limited. The catalyst of the present invention can be easily prepared by known methods. Additionally, examples of the method for supporting the catalyst of the present invention on the support include a spray method, a kneading method, an impregnation method, an adsorption method, and an ion exchange method.

The specific surface area of the catalyst of the present invention is not particularly limited, and is normally 5 to 200 m$^2$/g, preferably 10 m$^2$/g or more, and more preferably 20 m$^2$/g or more. As the method for measuring the specific surface area of the catalyst, it is possible to adopt the BET (Brunauer-Emett-Teller) method in which nitrogen adsorption is analyzed, as described later in Examples.

Moreover, as described later in Examples, the catalyst containing the base and/or the carbonate may be prepared by adding the base and/or the carbonate to water during a water oxidation reaction, or may be prepared by mixing the base and/or the carbonate with the transition element or the compound containing the element before the water oxidation reaction, or adding the base and/or the carbonate in such a manner as to coat the transition element or the compound containing the element therewith.

The concentration of the base added into water can be changed as appropriate depending on, for example, the types of the 3d-block transition metal element or the compound containing the element and the base to be used. Nevertheless, the concentration is normally 0.025 to 2 M, preferably 0.05 to 0.5 M, and particularly preferably 0.1 M.

The concentration of the carbonate added into water can be changed as appropriate depending on, for example, the type of the 3d-block transition metal element or the compound containing the element to be used. Nevertheless, the concentration is normally 0.01 to 2 M, preferably 0.1 to 1 M, and particularly preferably 0.5 M.

Further, the amounts of the 3d-block transition metal element or the compound containing the element and the base and/or the carbonate mixed therewith or added thereto can also be changed as appropriate depending on, for example, the types of the 3d-block transition metal element or the compound containing the element, the base, and the carbonate to be used. Nevertheless, the content of the 3d-block transition metal element or the compound containing the element and the content of the base and the carbonate are respectively normally 10 to 90% by mass and 90 to 10% by mass, preferably 20 to 80% by mass and 80 to 20% by mass, and more preferably 40% by mass and 60% by mass, provided that the amount of the entire catalyst is 100% by mass, for example.

Furthermore, the catalyst of the present invention may comprise a component other than the above-described 3d-block transition metal element, base, and carbonate, as appropriate. Examples of such a component include conductive carbon materials such as acetylene black and ketjen black, H$^+$ permeable membranes such as NAFION (registered trademark), and OH permeable membranes.

In addition, the catalyst of the present invention can be suitably used as an electrode catalyst of an anode electrode for electrolysis of water. Thus, the present invention can also provide: an anode electrode for electrolysis of water, comprising the above-described catalyst; and a water electrolyzer comprising the anode electrode for electrolysis of water.

The mode of the water electrolyzer of the present invention is not limited to this embodiment, and includes a mode comprising an electrolytic cell in which a diaphragm, a cathode electrode, and the anode electrode are arranged. Moreover, the water electrolyzer can also be used as an oxygen production apparatus, a hydrogen production apparatus, a carbon dioxide production apparatus, and a hydrocarbon compound production apparatus, as described below.

<Method for Producing Oxygen, Hydrogen, and the Like>

As described later in Examples, the use of the above-described water splitting catalyst makes it possible to efficiently oxidize and split water and produce oxygen, particularly, within a neutral range. Moreover, in the method of the present invention, water undergoes an oxidative decomposition according to the following reaction.

$$2H_2O \rightarrow O_2 + 4H^+ + 4e^-$$

In this manner, the method of the present invention can produce not only oxygen but also electrons and protons, and further reduce the protons to produce hydrogen, as well. Thus, the present invention also provides a method for producing oxygen and hydrogen, comprising bringing water into contact with the above-described water decomposition catalyst to oxidize and split the water.

In addition, in the case of using a carbonate, carbon dioxide can also be produced according to the following reaction.

$$2HCO_3^- \rightarrow O_2 + 2CO_2 + 2H^+ + 4e^-$$

Thus, the present invention also provides a method for producing oxygen, hydrogen, and carbon dioxide, comprising bringing water into contact with the above-described water splitting catalyst to oxidize and split the water.

The water subjected to the oxidative decomposition in the method of the present invention may be just water (so-called pure water), but may be in a form of aqueous solution containing an electrolyte and the like. Moreover, the pH of the water is not particularly limited, but is preferably within a neutral range (pH: 6 to 8).

Further, when carbon dioxide is, for example, added to the reaction system, hydrogen reduces the carbon dioxide or the like, enabling productions of hydrocarbon compounds (such as formic acid, formaldehyde, methanol, methane, ethane, propane), as well.

EXAMPLES

Hereinafter, the present invention will be more specifically described based on Examples. However, the present invention is not limited to the following Examples.

Example 1

In a water oxidation reaction, it is known that conventional artificial manganese catalysts exhibit a high activity under an alkaline condition but the catalyst activity and the stability thereof are very low under an approximately neutral condition. In this regard, the present inventors have revealed that Mn(III) is a reaction intermediate in an oxidation of water using α-manganese dioxide, and that the oxidation of water progresses after the generation of Mn(III). This Mn(III) is stable within an alkaline range, but is disproportionated into Mn(II) and Mn(IV) within a neutral range. Accordingly, in a neutral range, the electrochemical regeneration process of Mn(III) (Mn(II).OH$_2$→Mn(III).OH+e$^-$+H$^+$) is a rate-limiting step of the reaction, inducing a great reduction in the activity. Since Mn(II)→Mn(III) is believed to be a consecutive reaction in which a proton transfer reaction takes place after an electron transfer reaction, it is conceivable that if it is possible to drive a reaction in which protons and electrons are transferred to a substrate at the same time (CPET) within a neutral range, the reaction progresses without an unstable intermediate, and can enhance the catalytic activity.

Hence, an assumption that a base or a carbonate having a pKa of 8 or less was useful as an inducer for driving CPET was verified using materials and methods illustrated below.

<α-MnO$_2$ Synthesis>

In order to evaluate whether or not adding a base or a carbonate having a pKa of 8 or less changed the performance of manganese dioxide as an oxidation catalyst for water within a neutral range, α-manganese dioxide (α-MnO$_2$) was selected as an electrocatalyst used in the evaluation and synthesized by the method described below with reference to the description in "M. Singh et al., D. N. Thanh, P. Ulbrich, N. Strnadova, F. Stepanek, J. Solid State Chem., 2010, 183, 2979."

First, potassium permanganate and water were added into a beaker, stirred on a hot plate heated to 60° C. for the complete dissolution. A 0.2 M aqueous solution of acetic acid was prepared in another beaker, and manganese(II) chloride tetrahydrate was added thereto and stirred until the complete dissolution. Then, the manganese(II) chloride tetrahydrate solution was poured to the aqueous solution of potassium permanganate, and continuously stirred for 2 hours while immersed in a hot-water bath at 80° C. Subsequently, while being washed with ultrapure water, the reaction product was subjected to suction filtration using a membrane filter (0.2 μm), and dried overnight in a furnace at 80° C. Thus, the target product α-MnO$_2$ was obtained.

Note that reaction reagents used in the synthesis and their amounts are as follows.
Potassium permanganate: 0.79 g (Wako Pure Chemical Industries, Ltd.), manganese(II) chloride tetrahydrate: 0.78 g (Wako Pure Chemical Industries, Ltd.), acetic acid: 99.0%, 1.4 mL, ultrapure water: 21 mL.

<Electrode Preparation>

As an electrode substrate for supporting the α-MnO$_2$ thereon, an FTO electrode (fluorine-doped tin oxide electrode, SPD Laboratory, Inc.) was employed. Then, 40 mg of α-MnO$_2$ and 10 mL of ultrapure water were placed into a poly tube, and α-MnO$_2$ was dispersed using a homogenizer (amplitude 15) over 30 minutes. Attention was focused on the weight of α-MnO$_2$ in such a manner as to easily grasp the onset potential. Subsequently, ultrapure water was further added to make the total volume 100 mL, and sprayed on the washed FTO electrode using an automatic spray gun (Lumina, ST-6) to prepare an electrode. In this event, attention was focused in such a manner as to place the FTO electrode on a hot plate heated to 200° C., thereby preventing the spray mist from turning into drops on the substrate.

Note that powder X-ray diffractometry (XRD) (RIGAKU Corporation, SmartLab) was adopted for the characterization of the prepared sample. The X-ray source in the XRD measurement was Cu Kα radiation (λ=0.154 nm). The tube voltage and the tube current during the measurement were respectively 40 kV and 80 mA. The measurement was performed at a scan rate of 0.02 o/s. As a result, although unillustrated, a peak derived from α-MnO$_2$ was observed from the detected crystal phase.

<Electrochemical Measurement>

Figure 1:
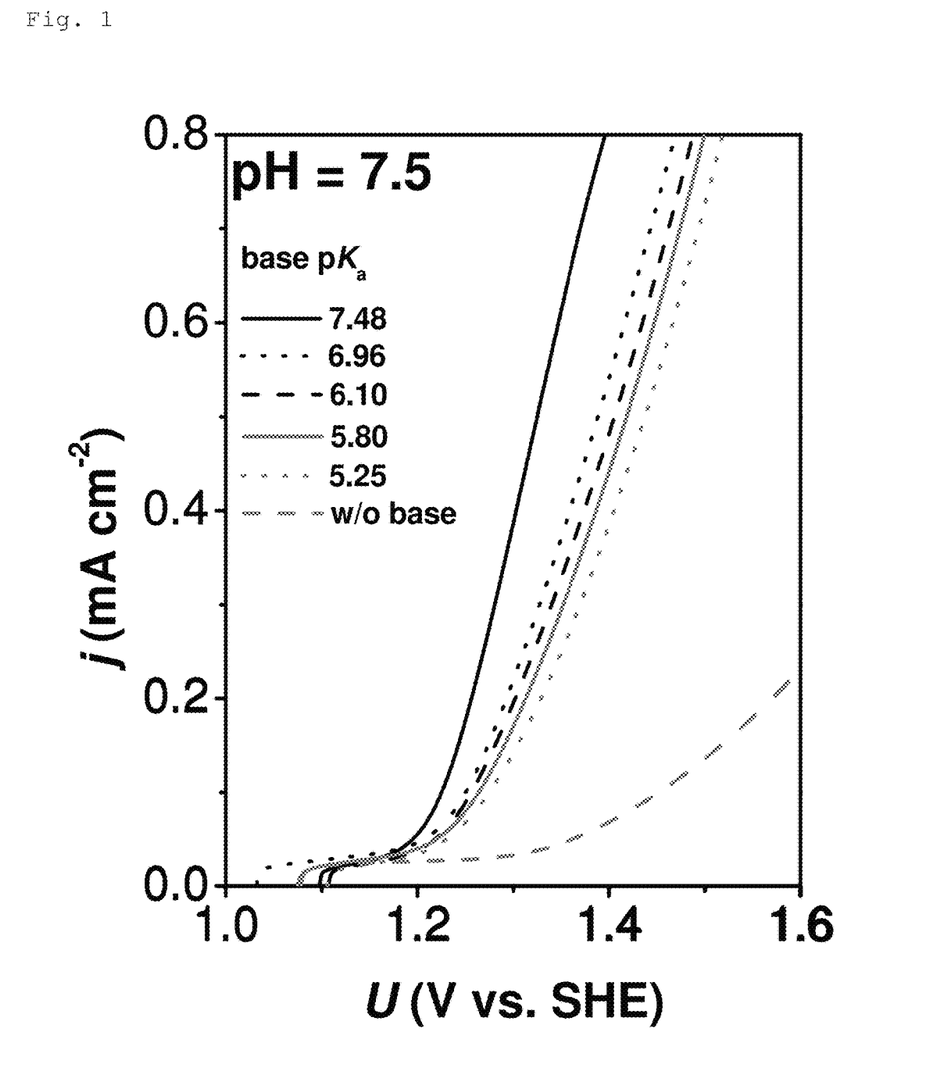
FIG. 1 is a linear sweep voltammogram showing changes in current and potential in generating oxygen when an electrode catalyst containing α-$MnO_2$ is used in the presence of each base (pH 7.5).

In order to evaluate the performance of α-manganese dioxide as an oxidation catalyst for water within a neutral range in the coexistence of each base, linear sweep voltammetry was carried out. As the experimental system, a three-electrode system was employed which used an FTO transparent glass electrode supporting the catalyst thereon (projection area: 3.14 cm$^2$) as a working electrode, a platinum wire as a counter electrode, and a Ag/AgCl (saturated KCl) electrode (+0.199 V vs. SHE) as a reference electrode. As the electrolyte solution, sodium sulfate (Wako Pure Chemical Industries, Ltd.) was used, and a 0.5 M aqueous solution of Na$_2$SO$_4$ was prepared for use. The base used was in an unprotonated state at 0.025 M by adding pyridine (Wako Pure Chemical Industries, Ltd., pKa: 5.25) or a derivative thereof 0-picoline (Wako Pure Chemical Industries, Ltd., pKa: 5.80), γ-picoline (Wako Pure Chemical Industries, Ltd., pKa: 6.10), 2,6-lutidine (Wako Pure Chemical Industries, Ltd., pKa: 6.96), or γ-collidine (Wako Pure Chemical Industries, Ltd., pKa: 7.48)). The linear sweep voltammetry was carried out under a condition of pH 7.5. Meanwhile, as reference examples, an example in which no base was added under a condition of pH 7.5 (w/o base) and an example in which no base was added under a condition of pH 13 (w/o base) were prepared, and the linear sweep voltammetry was carried out. FIG. 1 shows the obtained result.

Figure 2:
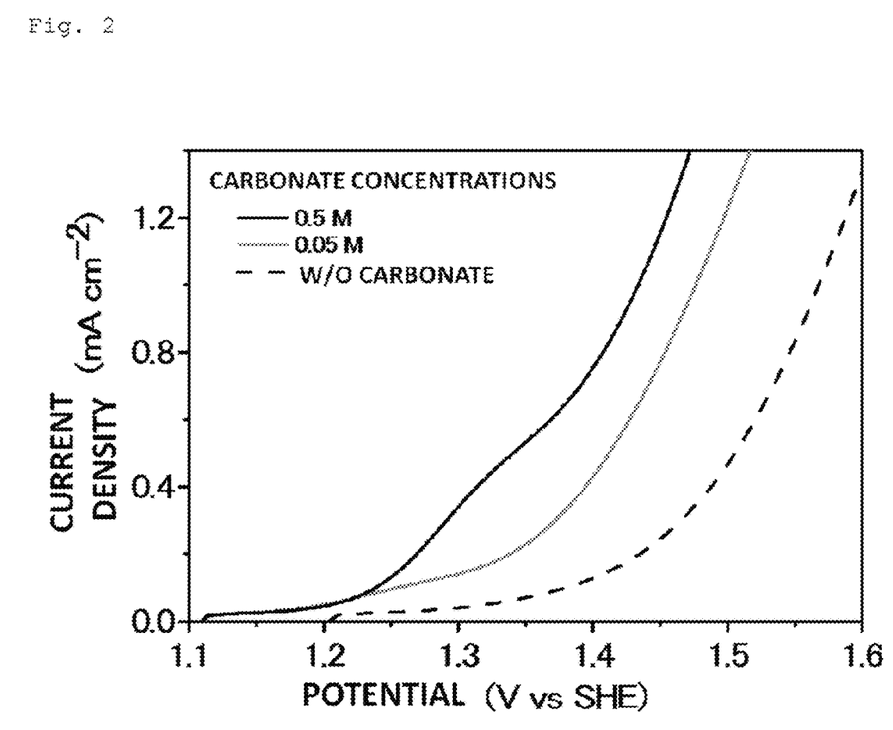
FIG. 2 is a linear sweep voltammogram showing changes in current and potential in generating oxygen when the electrode catalyst containing α-$MnO_2$ is used in the presence of a carbonate (pH 7.5).

Further, examples were prepared in which 0.01 to 1 M NaHCO$_3$ was added in place of the bases, and the linear sweep voltammetry was carried out in the same manner as described above. FIG. 2 shows the obtained result.

Note that an electrochemical cell was used in this measurement, and the sweeping was performed from the negative direction to minimize the pH change. Moreover, the electrochemical cell was formed such that the working electrode was positioned at the bottom, while the counter electrode and the reference electrode were inserted from the top. The distance between the working electrode and the reference electrode was 2 mm. The sweeping speed was set to 10 mV/s, while attention was focused in such a manner as to easily identify the onset potential.

<Gas Chromatography>

Figure 3:
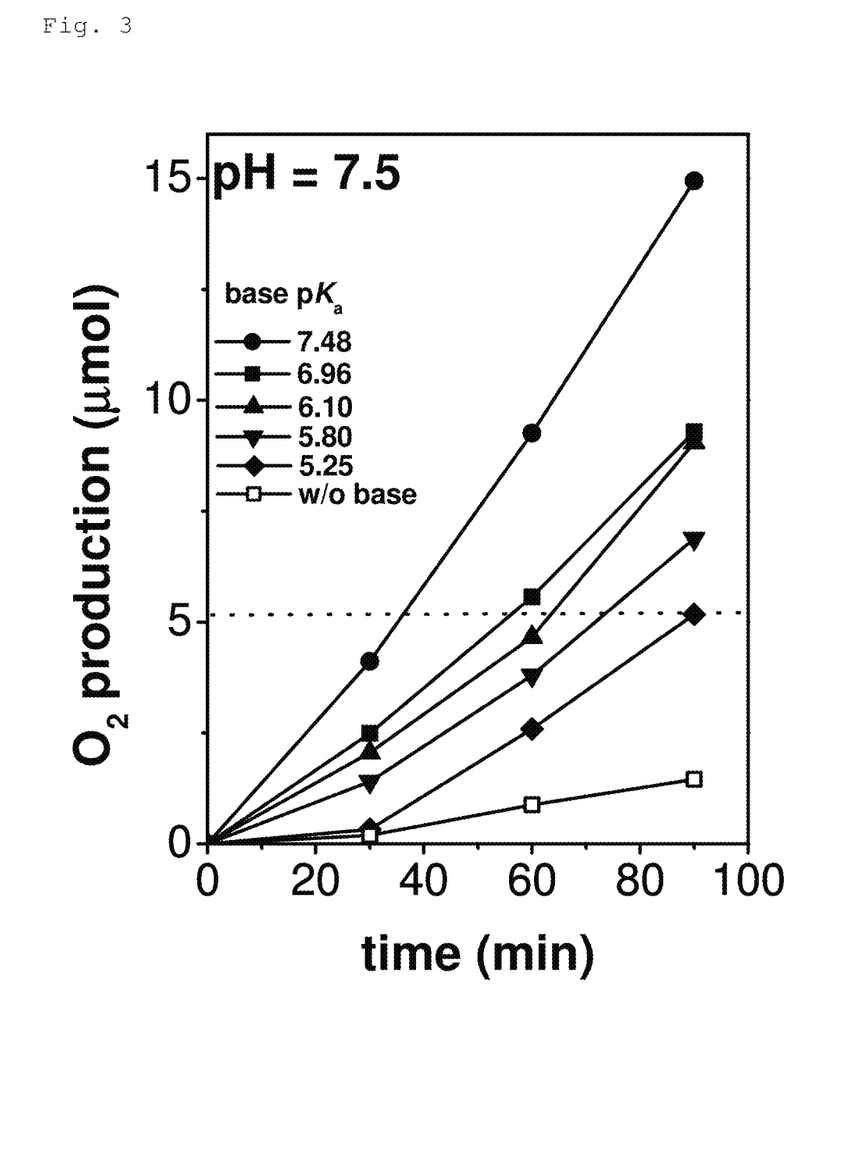
FIG. 3 is a graph showing a change over time in the amount of oxygen generated when the electrode catalyst containing α-$MnO_2$ is used in the presence of the base (pH 7.5).
Figure 4:
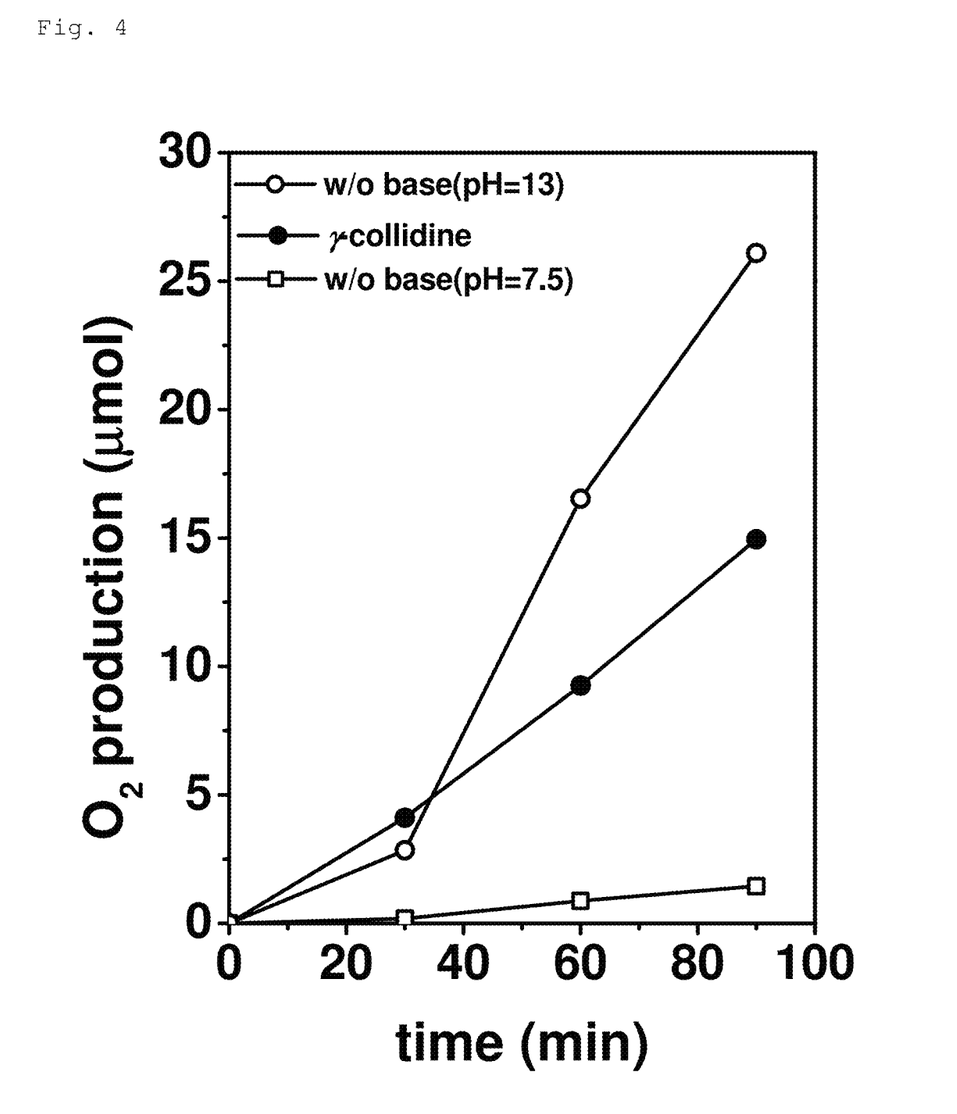
FIG. 4 is a graph showing a change over time the amount of oxygen generated when the electrode catalyst containing α-$MnO_2$ is used in the presence of γ-collidine (pH 7.5), in the absence of the base (pH 7.5), or in the absence of the base (pH 13).

In order to quantify the amount of oxygen generated by electrolysis of water using α-manganese dioxide within a neutral range in the coexistence of each base, gas chromatography was performed. As the experimental system, a two-compartment cell was employed in which the counter electrode side was separated from the working electrode-reference electrode side by a NAFION membrane (NAFION (registered trademark) 117, 0.007 inches). The volume of the gas phase at the working electrode side was set to 38.5 mL. After Ar bubbling for 20 minutes performed in the order of the counter electrode side and the working electrode side, and removal of oxygen dissolved in the cell, the measurement was performed. During the measurement, a potential of +1.4 V (vs. SHE) was applied, and stirring was carried out to prevent all oxygen from remaining in the solution. The measurement was performed every 30 minutes in minutes. In each measurement, 1 mL of a gas was collected using a gas-tight type syringe after cleaning with Ar. In a case where the TON (turnover number) did not exceed 1 even after the 90 minutes, the measurement interval was extended as appropriate to reduce a risk of air contamination at the time of the measurement, and the measurement was performed. Note that, in order to take the influence of such contamination therein into account, an increase in oxygen due to contamination was measured before the experiment was started. Under an assumption that the system had oxygen flowing therein at a uniform rate, a liner approximation equation for an increase in oxygen was calculated. The increase in oxygen was subtracted to obtain a net oxygen amount. Meanwhile, as reference examples, an example in which no base was added under a condition of pH 7.5, (w/o base (pH=7.5)) and an example in which no base was added under a condition of pH 13 (w/o base (pH=13)) were prepared. The amounts of oxygen generated were obtained therefrom as in the above-described cases of adding the bases. FIGS. 3 and 4 show the obtained result.

Further, another example was prepared in which 0.5 M $NaHCO_3$ was added in place of the bases, and the amount of oxygen generated was obtained in the same manner as described above.

As shown in FIG. 1, adding the bases having a pKa of 8 or less showed great reductions in the overpotential and enhancements of the current density. Further, it was observed that the degrees were increased as the pKa of the bases was increased. Furthermore, the pH dependency of the threshold potential within a neutral range started to be observed by the introduction of the bases. Accordingly, the reductions in the overpotential and the enhancements of the current density are presumably attributable to the induction of the CPET described above.

In addition, as shown in FIG. 2, the enhancements of the current density were also observed in the voltammogram by the addition of the carbonate, as in the cases of the bases having a pKa of 8 or less.

Moreover, as shown in FIG. 3, in the cases where the bases having a pKa of 8 or less were added, the amounts of oxygen generated, also, which were analyzed using the gas chromatography, were observed to have similar trends to those of the reductions in the overpotential and enhancements of the current density. Additionally, all of these amounts of oxygen generated had a TON exceeding 1, revealing that these water oxidation reactions progressed catalytically. Particularly, the activity of the base having a pKa of 7.48 (γ-collidine) was enhanced approximately 15 times in comparison with the condition under which no base was added. Further, as shown in FIG. 4, the catalytic activity was an activity comparable to approximately half of that within an alkaline range.

Furthermore, although unillustrated, in the case where 0.5 M $NaHCO_3$ was added (pH=8, 1.7 V vs SHE, electrolysis period: 100 minutes), 43 μmol of oxygen was generated. Note that in a case where 50 mM pyridine was added under the same conditions, 17 μmol of oxygen generation was observed. Meanwhile, in the case where the carbonate was added, carbon dioxide detection was examined, too. As a result, carbon dioxide generation was also observed; furthermore, the generated amount was twice larger than that of oxygen.

Example 2

As described above, it was revealed that the performance of α-manganese dioxide as the catalyst in a water oxidation reaction within a neutral range was greatly enhanced by adding the bases having a pKa of 8 or less. Nevertheless, such an oxidative decomposition targets not only water but also the added bases. Accordingly, the oxidative decompositions of the bases also progress, while competing with the water oxidation. Hence, in order to more stably enhance the catalytic activity of manganese dioxide within a neutral range, the specificity to water (coulombic efficiency) in an oxidative decomposition reaction in the coexistence of pyridine was evaluated by the method illustrated below using four types of manganese dioxide having different crystal structures (α-manganese dioxide, β-manganese dioxide, γ-manganese dioxide, δ-manganese dioxide) as electrode catalysts.

<β-$MnO_2$ Synthesis>

β-Manganese dioxide (β-$MnO_2$) was synthesized by the method illustrated below with reference to the synthesis method described in "David M. Robinson, Yong Bok Go, Michelle Mui, Graeme Gardner, Zhijuan Zhang, Daniel D. T. Mastrogiovanni, Eric Garfunkel, Jing Li, Martha Greenblatt, and G. Charles Dismukes J., J. Am. Chem. Soc., 2013, 135 (9), 3494."

First, ultrapure water, manganese(II) sulfate pentahydrate, and sodium persulfate were added into a beaker and stirred until the complete dissolution. Then, the mixture was transferred to a hydrothermal synthesis vessel made of TEFLON (registered trademark), and subjected to hydrothermal synthesis for 12 hours in a furnace at 120° C. Subsequently, while being washed with ultrapure water, the obtained reaction product was subjected to suction filtration using a membrane filter (0.2 μm), and dried overnight in a furnace at 80° C. To increase the purity, the resultant and also 25 mL of an aqueous solution of sodium persulfate (0.08 M) per g of the reaction product were transferred to a hydrothermal synthesis vessel made of TEFLON (registered trademark), and subjected to hydrothermal synthesis for 12 hours in a furnace at 120° C. Thereafter, while being washed with ultrapure water, the obtained reaction product was subjected to suction filtration using a membrane filter (0.2 μm), and dried overnight in a furnace at 90° C. Thus, the target product β-$MnO_2$ was obtained.

Note that reaction reagents used in the synthesis and their amounts are as follows.
Manganese(II) sulfate pentahydrate: 1.90 g (Wako Pure Chemical Industries, Ltd.), sodium persulfate: 1.90+0.23 g (Wako Pure Chemical Industries, Ltd.), ultrapure water: 52 mL.

<γ-$MnO_2$ Synthesis>

γ-Manganese dioxide (γ-$MnO_2$) was synthesized by the method illustrated below with reference to the synthesis method described in "S. Liang, F. Teng, G. Bulgan, R. Zong, Y. Zhu, J. Phys. Chem. C., 2008, 14, 5311. 25."

First, ultrapure water, manganese(II) sulfate pentahydrate, and ammonium persulfate were added into a beaker and stirred until the complete dissolution. Then, the mixture was transferred to a hydrothermal synthesis vessel made of TEFLON (registered trademark), and subjected to hydrothermal synthesis for 24 hours in a furnace at 90° C. While being washed with ultrapure water, the obtained reaction product was subjected to suction filtration using a membrane filter (0.2 μm), and dried overnight in a furnace at 60° C. Thus, the target product γ-$MnO_2$ was obtained.

Note that reaction reagents used in the synthesis and their amounts are as follows.

Manganese(II) sulfate pentahydrate: 1.20 g (Wako Pure Chemical Industries, Ltd.), ultrapure water: 20 mL, ammonium persulfate: 1.14 g (Wako Pure Chemical Industries, Ltd.).

<δ-$MnO_2$ Synthesis>

δ-Manganese dioxide (δ-$MnO_2$) was synthesized by the method illustrated below with reference to the synthesis method described in "David M. Robinson, Yong Bok Go, Michelle Mui, Graeme Gardner, Zhijuan Zhang, Daniel D. T. Mastrogiovanni, Eric Garfunkel, Jing Li, Martha Greenblatt, and G. Charles Dismukes J., J. Am. Chem. Soc., 2013, 135 (9), 3494."

First, ultrapure water and glucose were added into a beaker and stirred until the complete dissolution. Potassium permanganate and water were added into another beaker and stirred for the complete dissolution. The aqueous solution of potassium permanganate was poured to the aqueous solution of glucose. After water was removed over 2 hours, the product was dried for 24 hours in a furnace at 110° C. Then, the resultant was transferred to a crucible and calcined for 2 hours in a furnace at 400° C. While being washed with ultrapure water, the obtained reaction product was subjected to suction filtration using a membrane filter (0.2 μm), and dried overnight in a furnace at 80° C. Thus, the target product δ-$MnO_2$ was obtained.

Note that reaction reagents used in the synthesis and their amounts are as follows.

Potassium permanganate: 3.00 g (Wako Pure Chemical Industries, Ltd.), D(+)-glucose: 5.04 g (Wako Pure Chemical Industries, Ltd.), ultrapure water: 70 mL.

<Electrode Preparation>

As in the above-described case of α-$MnO_2$, an FTO electrode was used as an electrode substrate, and electrodes respectively supporting four types of manganese dioxide (including α-$MnO_2$) having different crystal phases were prepared by a spray method.

Note that powder X-ray diffractometry (XRD) (RIGAKU Corporation, SmartLab) was adopted for the characterization of the prepared sample. The X-ray source in the XRD measurement was Cu Kα radiation (λ=0.154 nm). The tube voltage and the tube current during the measurement were respectively 40 kV and 80 mA. The measurement was performed at a scan rate of 0.02 o/s. As a result, although unillustrated, peaks of the target substances were observed from all of the crystal phases.

Moreover, the specific surface area was measured using a BET specific surface area analyzer (manufactured by Shimadzu Corporation, TriStar 3000) and calculated by adopting a multipoint method. As the adsorption gas, nitrogen (effective cross-sectional area: $0.162 \times 10^{-18}$) was used. Table 1 shows the obtained result.

TABLE 1

| | BET specific surface area ($m^2/g$) |
|---|---|
| α-$MnO_2$ | 110.6 |
| β-$MnO_2$ | 24.6 |
| γ-$MnO_2$ | 66.6 |
| δ-$MnO_2$ | 19.7 |

<Electrochemical Measurement>

In order to evaluate the performance of each Mn material as an oxidation catalyst for water, linear sweep voltammetry was carried out. As the experimental system, a three-electrode system was employed which used an FTO transparent glass electrode supporting the catalyst thereon (projection area: 3.14 $cm^2$) as a working electrode, a platinum wire as a counter electrode, and a Ag/AgCl (saturated KCl) electrode (+0.199 V vs. SHE) as a reference electrode. As the electrolyte solution, sodium sulfate (Wako Pure Chemical Industries, Ltd.) was used, and a 0.5 M aqueous solution of $Na_2SO_4$ was used. The base used was in a state at 0.1 M by adding pyridine (Wako Pure Chemical Industries, Ltd., pKa: 5.25). The linear sweep voltammetry was carried out under a condition of pH 8.

Note that an electrochemical cell was used in this measurement, and the sweeping was performed from the negative direction to minimize the pH change. Moreover, the electrochemical cell was formed such that the working electrode was positioned at the bottom, while the counter electrode and the reference electrode were inserted from the top. The distance between the working electrode and the reference electrode was 2 mm. The sweeping speed was set to 10 mV/s, while attention was focused in such a manner as to easily identify the onset potential.

<Gas Chromatography>

In order to quantify the amount of oxygen generated by electrolysis of water, gas chromatography was performed. As the experimental system, a two-compartment cell was employed in which the counter electrode side was separated from the working electrode-reference electrode side by a NAFION membrane (Nafion (registered trademark) 117, 0.007 inches). The volume of the gas phase at the working electrode side was set to 38.5 mL. After Ar bubbling for 20 minutes performed in the order of the counter electrode side and the working electrode side, and removal of oxygen dissolved in the cell, the measurement was performed. During the measurement, a potential of +1.4 V (vs. SHE) was applied, and stirring was carried out to prevent all oxygen from remaining in the solution. The measurement was performed every 30 minutes in 90 minutes. In each measurement, 1 mL of a gas was collected using a gas-tight type syringe after cleaning with Ar. In a case where the TON did not exceed 1 even after the 90 minutes, the measurement interval was extended as appropriate to reduce a risk of air contamination at the time of the measurement, and the measurement was performed.

Figure 5:
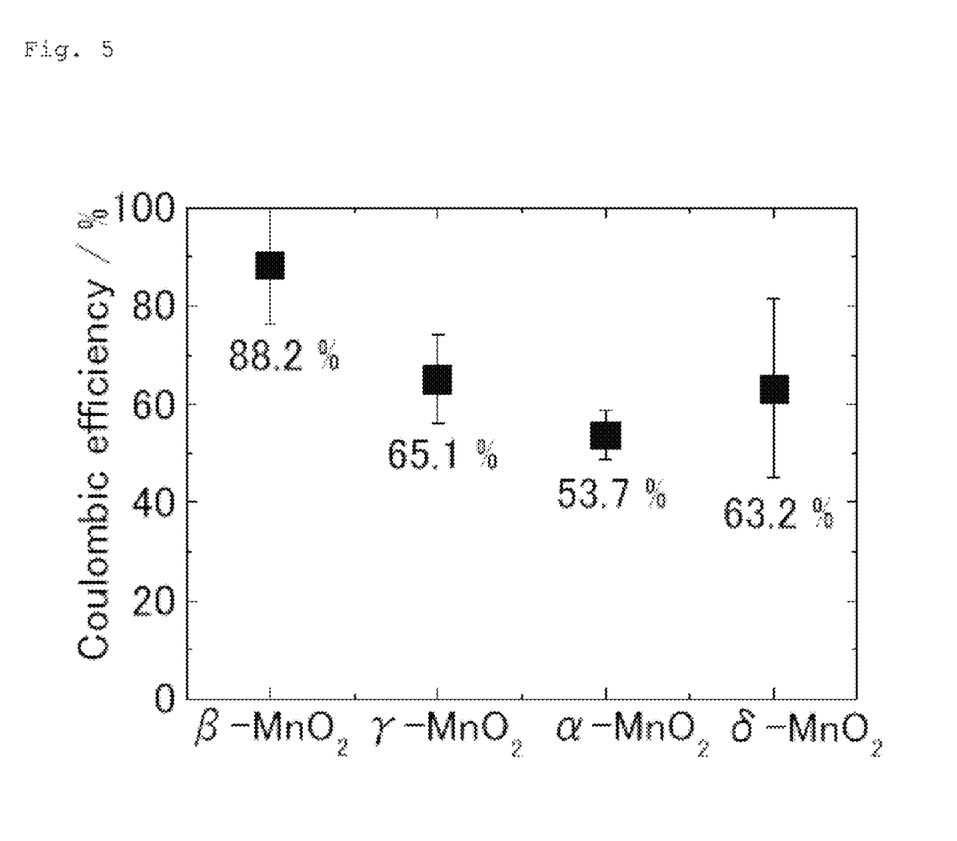
FIG. 5 is a dot plot showing coulombic efficiencies when electrode catalysts containing α-$MnO_2$, β-$MnO_2$, γ-$MnO_2$, or δ-$MnO_2$ are used in the presence of pyridine (pH 8).

Moreover, based on the obtained amount of oxygen generated, the coulombic efficiency (substrate selectivity with the potential being held constant (1.4 V vs. SHE)) of each sample was calculated. Specifically, a percentage of electrons involved in a water oxidation among all charges having flowed during a reaction was calculated from the amount of oxygen generated. Note that, in order to take the influence of such contamination therein into account, an increase in oxygen due to contamination was measured before the experiment was started. Under an assumption that the system had oxygen flowing therein at a uniform rate, a liner approximation equation for an increase in oxygen was calculated. The increase in oxygen was subtracted to obtain a net oxygen amount. FIG. 5 shows the obtained result.

As shown in FIG. 5, α-$MnO_2$, γ-$MnO_2$, and δ-$MnO_2$ had a coulombic efficiency of 54%, 65%, and 63%, respectively, while β-$MnO_2$ had a high coulombic efficiency value of 88%, which was higher than the selectivity of α-$MnO_2$ by 30% or more. In other words, it was revealed that β-$MnO_2$ was capable of oxidizing water with high selectivity even in the coexistence of pyridine that was thermodynamically more likely to be oxidized than water.

Furthermore, although unillustrated, while the potential was being held constant, the amount of oxygen generated by α-$MnO_2$ in 4 hours (240 minutes) was approximately 8 μmol, whereas that of β-$MnO_2$ was approximately 6 μmol. In consideration that the specific surface area of α-$MnO_2$ was 110.6 m$^2$/g while that of β-MnO$_2$ was 24.6 m$^2$/g, it was also revealed that, in terms of per unit area of the catalyst, the amount of oxygen generated by β-MnO$_2$ was enhanced 3 to 4 times in comparison with α-MnO$_2$.

As has been described above, the present invention makes it possible to provide a catalyst that exhibits a high catalyst activity in a water oxidation reaction within a neutral range.

Therefore, the water splitting catalyst of the present invention is useful in productions of oxygen, protons, hydrogen, electrons, hydrocarbons, and the like using water as the raw material.

What is claimed is:

1. A device for water splitting comprising:
    an electrode;
        a catalytic layer, disposed on the electrode, comprising at least one selected from the group consisting of oxides and hydroxides of 3d-block transition metal element selected from manganese, iron, nickel, and copper;
    an electrolytic cell in which the electrode and
    a base and/or a carbonate having a pKa of 8 or less are disposed, provided that the base and/or a carbonate is disposed out of the catalytic layer;
        wherein the device has a higher current density at a certain potential for splitting water having a pH ranging from 6 to 8, compared with a current density at the certain potential for splitting water having the pH without the base and/or the carbonate;
    the concentration of the base added into water in the electrolytic cell is 0.025 M to 2 M; and
    the concentration of the carbonate added into water in the electrolytic cell is 0.01 M to 1 M.

2. The device according to claim 1, wherein the catalytic layer comprises at least manganese dioxide.

3. The device according to claim 1, wherein the catalytic layer comprises at least β-manganese dioxide.

4. The device according to claim 1, wherein the base is a nitrogen-containing heterocyclic compound.

5. The device according to claim 1, wherein the base is collidine.

6. A method for producing oxygen and hydrogen, comprising preparing an electrode having a catalytic layer thereon which comprises at least one selected from the group consisting of oxides and hydroxides of 3d-block transition metal element selected from manganese, iron, nickel, and copper; and
    allowing water having a pKa of 8 or less to contact with the catalytic layer along with a base and/or a carbonate, thereby to split the water;
    wherein the catalytic activity of the catalytic layer during splitting water having a pH of 6 to 8 is enhanced compared with the catalytic activity of the catalytic layer during splitting water having a pH of 6 to 8 without the base and/or the carbonate;
    the concentration of the base added into the water in 0.025 M to 2 M; and
    the concentration of the carbonate added into the water is 0.01 M to 1 M.

7. The method according to claim 6, wherein the catalytic layer comprises at least manganese dioxide.

8. The method according to claim 6, wherein the catalytic layer comprises at least β-manganese dioxide.

9. The method according to claim 6, wherein the base is a nitrogen-containing heterocyclic compound.

10. The method according to claim 6, wherein the base is collidine.

* * * * *